(12) United States Patent
Ehara

(10) Patent No.: US 11,561,741 B2
(45) Date of Patent: Jan. 24, 2023

(54) COMPUTER-READABLE MEDIUM, APPARATUS, PRINTING APPARATUS AND PRINTING SYSTEM

(71) Applicant: MAX CO., LTD., Tokyo (JP)

(72) Inventor: Takayuki Ehara, Tokyo (JP)

(73) Assignee: MAX CO., LTD., Tokyo (JP)

( * ) Notice: Subject to any disclaimer, the term of this patent is extended or adjusted under 35 U.S.C. 154(b) by 104 days.

(21) Appl. No.: 17/320,556

(22) Filed: May 14, 2021

(65) Prior Publication Data

US 2021/0357160 A1 Nov. 18, 2021

(30) Foreign Application Priority Data

May 15, 2020 (JP) .............................. JP2020-085793

(51) Int. Cl.
*G06F 3/12* (2006.01)

(52) U.S. Cl.
CPC .......... *G06F 3/1204* (2013.01); *G06F 3/1208* (2013.01); *G06F 3/1243* (2013.01); *G06F 3/1255* (2013.01); *G06F 3/1256* (2013.01); *G06F 3/12* (2013.01)

(58) Field of Classification Search
CPC .... G06F 3/1204; G06F 3/1208; G06F 3/1243; G06F 3/1255; G06F 3/1256; G06F 2113/16; G06F 30/18; G06F 3/1205; G06K 19/04; B26D 3/085; B26D 5/00; B26F 1/38; B41J 11/663; B41J 3/4075; B41J 11/66
USPC ...................................................... 358/1.15
See application file for complete search history.

(56) References Cited

U.S. PATENT DOCUMENTS

| | | | |
|---|---|---|---|
| 2009/0103123 A1* | 4/2009 | Ikedo | ..................... B41J 3/4075 358/1.18 |
| 2009/0106649 A1* | 4/2009 | Nose | ..................... G06F 40/103 715/243 |
| 2014/0293297 A1 | 10/2014 | Nagahara | |

FOREIGN PATENT DOCUMENTS

| | | |
|---|---|---|
| EP | 2705957 B1 | 3/2014 |
| JP | 2003-170628 A | 6/2003 |
| JP | 2017-026888 A | 2/2017 |
| JP | 2018-172608 A | 11/2018 |

(Continued)

OTHER PUBLICATIONS

Extended European Search Report for EP Application No. 21173845.5 dated Oct. 26, 2021. (12 pp.).

(Continued)

*Primary Examiner* — Darryl V Dottin
(74) *Attorney, Agent, or Firm* — Weihrouch IP

(57) ABSTRACT

A non-transitory computer-readable medium stores a computer program for setting a shape of a label causing a computer to execute: receiving an input of first information for setting a width of a second part in a first direction; receiving an input of second information for setting a height in a second direction of a display area of the second part; receiving an input of third information for setting a height in the second direction of an overlap width area of the second part, an end portion of the display area in a third direction being capable of adhering to the overlap width area; receiving an input of fourth information for setting a height of a first protruding portion in the second direction; and setting a shape of the label, based on the input first information, second length information, third length information and fourth information.

16 Claims, 8 Drawing Sheets

(56) References Cited

FOREIGN PATENT DOCUMENTS

JP 2019-179104 A 10/2019

OTHER PUBLICATIONS

"Inkscape", Oct. 5, 2011 (Oct. 5, 2011), Retrieved from the Internet:URL:http://en.flossmanuals.net/_booki/inkscape/inkscape.pdf.

* cited by examiner

COMPUTER-READABLE MEDIUM, APPARATUS, PRINTING APPARATUS AND PRINTING SYSTEM

CROSS-REFERENCE TO RELATED APPLICATIONS

This application is based on and claims priority under 35 USC 119 from Japanese Patent Application No. 2020-085793 filed on May 15, 2020, the contents of which are incorporated herein by reference.

TECHNICAL FIELD

The present disclosure relates to a computer-readable medium, an apparatus, a printing apparatus and a printing system.

BACKGROUND ART

In order to identify a cable such as an optical fiber, an electric wire and a LAN cable from other cables, a label (which may also be referred to as 'tag') that is wrapped around the cable is known. A printing apparatus for producing the label is known.

JP-A-2003-170628 (hereinafter, referred to as PTL 1) discloses a printing apparatus that can easily set a margin according to a diameter of a cable when producing a label. When a diameter or outer periphery of a connection cable is input, the printing apparatus can set a size of a margin to an outer periphery length of the cable.

JP-A-2018-172608 (hereinafter, referred to as PTL 2) discloses a printing apparatus for printing labels that can be wrapped around cables having diverse outer diameter sizes. The printing apparatus is configured to print labels having a plurality of cuts for separating the labels. For this reason, a user can obtain a label having a desired length by separating the label along a selected cut.

JP-A-2017-26888 (hereinafter, referred to as PTL 3) discloses a printing apparatus for printing a label that can be easily detached after being wrapped around a cable. The printing apparatus can print a label having a plurality of slits provided in a width direction of a wrapping portion. For this reason, a user can easily detach the label from the cable by strongly pulling the label.

However, the printing apparatuses disclosed in PTLs cannot freely set a label shape. Since all the printing apparatuses disclosed in PTLs 1 to 3 are each configured to produce the label by cutting a tape roll having a predetermined roll, a width of the label is limited to a width of the tape.

The present inventors noticed that according to the printing apparatuses, the information to be displayed on the label cannot be all displayed on the label, and to the contrary, a label having a display area that is too large as compared to the information to be displayed on the label should be printed, in some cases. On the other hand, if the production of a label shape is wholly entrusted to a user, the burden on the user is too great. In addition, a label having a function that the user desires may not be completed.

It is therefore an object of the present disclosure to provide a computer-readable medium, an apparatus, a printing apparatus and a printing system capable of easily setting a label shape that a user desires.

SUMMARY OF INVENTION

The present disclosure provides a non-transitory computer-readable medium storing a computer program. The computer program is a program for setting a shape of a label having a front surface and a back surface provided on an opposite side to the front surface and capable of being wrapped around a cable extending in a first direction. The label has: a first part; and a second part adjacent to the first part in the first direction. The first part has a first protruding portion further protruding than the second part in a second direction perpendicular to the first direction and having a first adhesive surface on the back surface, and the second part has a second protruding portion further protruding than the first part in a third direction opposite to the second direction and having a second adhesive surface on the back surface. The computer program causes a computer to execute: receiving an input of label width information for setting a width of the second part in the first direction; receiving an input of display area length information for setting a height in the second direction of a display area of the second part; receiving an input of overlap width length information for setting a height in the second direction of an overlap width area of the second part, an end portion of the display area in the third direction being capable of adhering to the overlap width area; receiving an input of temporary fixed length information for setting a height of the first protruding portion in the second direction; and setting a shape of the label, based on the input label width information, display area length information, overlap width length information and temporary fixed length information.

The present disclosure provides another non-transitory computer-readable medium storing a computer program. The computer program is a program for setting a shape of a label having a front surface and a back surface provided on an opposite side to the front surface and capable of being wrapped around a cable extending in a first direction. The label has: a first label portion comprising a first display area; a second label portion adjacent to the first label portion in the first direction and comprising a second display area; and a leg portion adjacent to the first label portion in a second direction perpendicular to the first direction and having a width smaller than a width of the first display area in the first direction so as to wrap around the cable. The computer program causes a computer to execute: receiving an input of label width information for setting a width of the first label portion in the first direction; receiving an input of wrapping portion width information for setting a width of the leg portion in the first direction; receiving an input of wrapping portion length information for setting a height in the second direction of a wrapping portion of the leg portion, the wrapping portion facing a surface of the cable when wrapped around the cable; receiving an input of neck length information for setting an interval in the second direction between the wrapping portion of the leg portion and the first label portion; and setting a shape of the label, based on the input label width information, wrapping portion width information, wrapping portion length information and neck length information.

The present disclosure provides still another non-transitory computer-readable medium storing a computer program. The computer program is a program for setting a shape of a label having a front surface and a back surface provided on an opposite side to the front surface and capable of being wrapped around a cable extending in a first direction. The label has: a label portion comprising a display area and configured to be wrapped around the cable; and a laminate portion adjacent to the label portion in a second direction perpendicular to the first direction and configured to be wrapped on the label portion. The computer program causes a computer to execute: receiving an input of label width information for setting a width of the label portion in the first direction; receiving an input of display area length information for setting a height of the label portion in the second direction; receiving an input of laminate length information for setting a height of the laminate portion in the second direction; and setting a shape of the label, based on the input label width information, display area length information and laminate length information.

The present disclosure also provides an apparatus. The apparatus is an apparatus for setting a shape of a label having a front surface and a back surface provided on an opposite side to the front surface and capable of being wrapped around a cable extending in a first direction. The label has: a first part; and a second part adjacent to the first part in the first direction. The first part has a first protruding portion further protruding than the second part in a second direction perpendicular to the first direction and having a first adhesive surface on the back surface, and the second part has a second protruding portion further protruding than the first part in a third direction opposite to the second direction and having a second adhesive surface on the back surface. The apparatus is configured to: acquire label width information for setting a width of the second part in the first direction; acquire display area length information for setting a height in the second direction of a display area of the second part; acquire overlap width length information for setting a height in the second direction of an overlap width area of the second part, an end portion of the display area in the third direction being capable of adhering to the overlap width area; acquire temporary fixed length information for setting a height of the first protruding portion in the second direction; and set a shape of the label, based on the acquired label width information, display area length information, overlap width length information and temporary fixed length information.

The present disclosure provides a different apparatus. The apparatus is an apparatus for setting a shape of a label having a front surface and a back surface provided on an opposite side to the front surface and capable of being wrapped around a cable extending in a first direction. The label has: a first label portion comprising a first display area; a second label portion adjacent to the first label portion in the first direction and comprising a second display area; and a leg portion adjacent to the first label portion in a second direction perpendicular to the first direction and having a width smaller than a width of the first display area in the first direction so as to wrap around the cable. The apparatus is configured to: acquire label width information for setting a width of the first label portion in the first direction; acquire wrapping portion width information for setting a width of the leg portion in the first direction; acquire wrapping portion length information for setting a height in the second direction of a wrapping portion of the leg portion, the wrapping portion facing a surface of the cable when wrapped around the cable; acquire neck length information for setting an interval in the second direction between the wrapping portion of the leg portion and the first label portion; and set a shape of the label, based on the acquired label width information, wrapping portion width information, wrapping portion length information and neck length information.

The present disclosure also provides a different apparatus. The apparatus is an apparatus for setting a shape of a label having a front surface and a back surface provided on an opposite side to the front surface and capable of being wrapped around a cable extending in a first direction. The label has: a label portion comprising a display area and configured to be wrapped around the cable; and a laminate portion adjacent to the label portion in a second direction perpendicular to the first direction and configured to be wrapped on the label portion. The apparatus is configured to: acquire label width information for setting a width of the label portion in the first direction; acquire display area length information for setting a height of the label portion in the second direction; acquire laminate length information for setting a height of the laminate portion in the second direction; and set a shape of the label, based on the acquired label width information, display area length information and laminate length information.

The present disclosure also provides a printing apparatus. The printing apparatus includes: a conveying unit configured to convey a print medium having a release paper and a label sheet bonded to the release paper; a printing unit configured to perform printing on the label sheet; and a cutting unit configured to acquire information indicative of the shape of the label set by the apparatus as described above and cutting the label sheet based on the acquired information.

The present disclosure also provides a printing system. The printing system includes: a conveying unit configured to convey a print medium having a release paper and a label sheet bonded to the release paper; a printing unit configured to perform printing on the label sheet; the apparatus as described above; and a cutting unit configured to acquire information indicative of the shape of the label set by the apparatus and cutting the label sheet based on the acquired information.

DESCRIPTION OF EMBODIMENTS

Hereinafter, embodiments of the present disclosure will be described with reference to the drawings. The embodiments are just examples for illustrating the present disclosure, and are not intended to limit the present disclosure.

Figure 1:
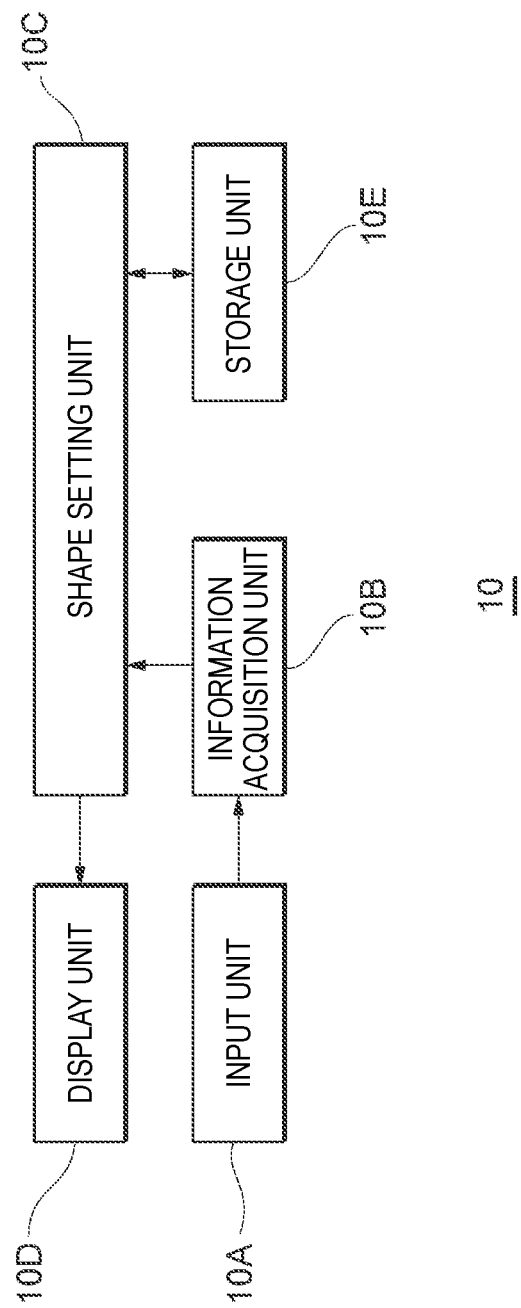
FIG. 1 is a block diagram showing a physical configuration of an apparatus 10.

FIG. 1 is a functional block diagram of an apparatus 10 for setting a label shape according to the present embodiment.

The apparatus 10 can be implemented, for example, by a general-purpose computer in which a computer program of the present embodiment is installed. The apparatus 10 includes an input unit 10A for inputting information for setting various shapes of a label, an information acquisition unit 10B configured to acquire the information input by the input unit 10A, a shape setting unit 10C configured to set a label shape based on the information acquired by the information acquisition unit 10B, and a display unit 10D for displaying the label shape set by the shape setting unit 10C and the like. The apparatus 10 further includes a storage unit 10E for storing a computer program for setting a label shape shown in the present embodiment (which may also be hereinafter referred to as "shape setting program". Note that, the computer program includes data necessary to set a shape, such as data indicating a cable shape. In addition, the computer program may be configured as an application program that is activated on an OS.), shape data for specifying the label shape set by the shape setting program, and the like. The information that is acquired by the information acquisition unit 10B and the information that is displayed by the display unit 10D will be described later in detail.

Figure 2:
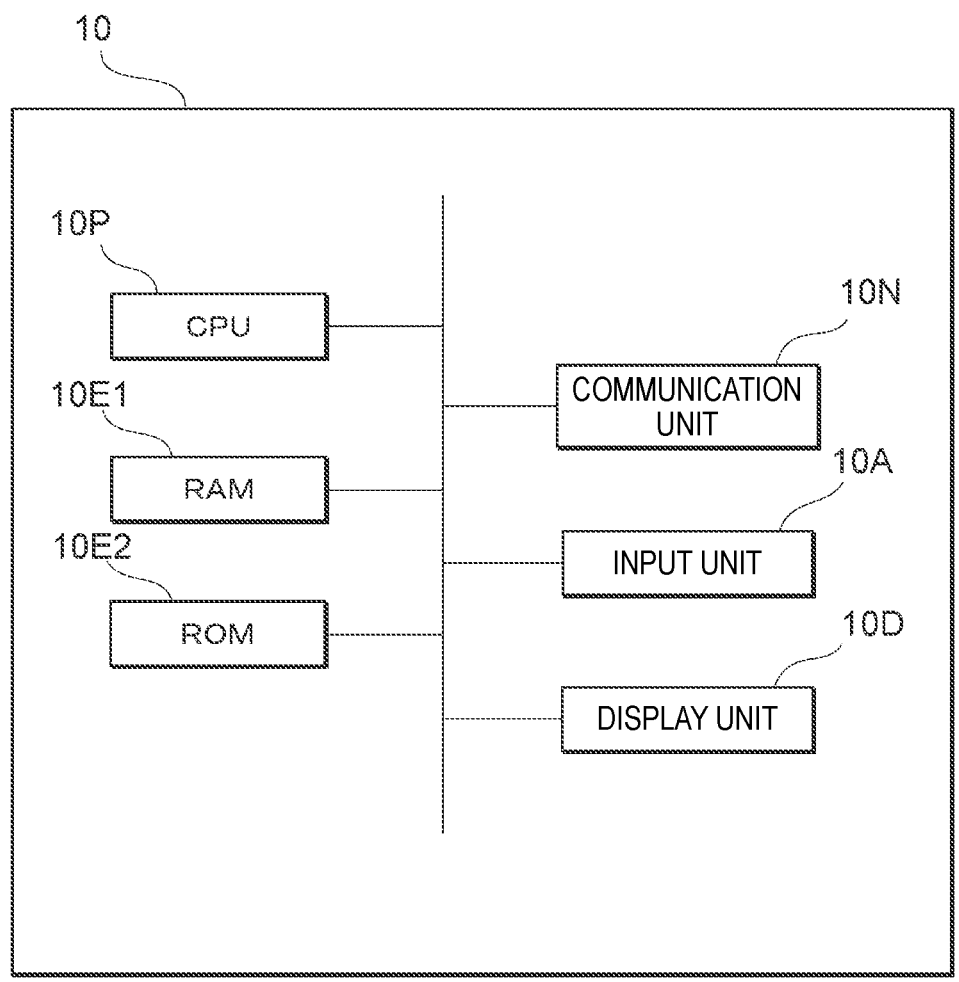
FIG. 2 is a functional block diagram of the apparatus 10.

FIG. 2 is a block diagram showing a physical configuration of the apparatus 10. The apparatus 10 includes a CPU (Central Processing Unit) 10P, a RAM (Random Access Memory) 10E1 and a ROM (Read only Memory) 10E2 configured to function as the storage unit 10E, a communication unit 10N, the input unit 10A, and the display unit 10D. The constitutional elements are connected to each other via a bus so that data and signals can be transmitted and received. Note that, in the present embodiment, an aspect where the apparatus 10 is constituted by one computer is described. However, the apparatus 10 may also be implemented by a combination of a plurality of computers. For example, the apparatus 10 may be configured to execute some or all of arithmetic processing by a different processor connected via a communication network such as the Internet. The apparatus 10 may also be configured so that some information is stored by an SD card detachably mounted to the apparatus 10. The configuration shown in FIG. 1 is just an example. That is, the apparatus 10 may include a configuration, in addition to the constitutional elements, and may not include some of the constitutional elements.

The CPU 10P includes a processor configured to execute a computer program stored in the RAM 10E1 or the ROM 10E2, thereby performing each arithmetic processing shown in the present embodiment and other processing. Therefore, the CPU 10P executes predetermined arithmetic processing according to the shape setting program, thereby functioning as the shape setting unit 10C. The CPU 10P is also configured to function as the information acquisition unit 10B configured to acquire information from the input unit 10A, the storage unit 10E and the communication unit 10N. Further, the CPU 10P is configured to store results of computations and the like in the RAM 10E1 or the ROM 10E2.

The ROM 10E2 is configured to store necessary information including the shape setting program (including data necessary for each arithmetic processing) and results of computations (including label shape data). The ROM 10E2 is constituted, for example, by a semiconductor storage device capable of electrically rewriting information, such as a NOR flash memory and a NAND flash memory or a CD, a DVD or an HDD capable of optically or magnetically recording information. For example, the ROM 10E2 may include, as a partial configuration thereof, an SD card or a USB memory in which label shape data, which is results of computations by the computer program according to the present embodiment, is stored. Further, a server configured to store the computer program of the present embodiment and connected to the CPU 10P via a network may be provided.

The RAM 10E1 is configured to temporarily store information such as data necessary for each arithmetic processing of the computer program according to the present embodiment. The RAM 10E1 is constituted, for example, by a randomly accessible semiconductor storage device such as an SRAM (Static Random Access Memory) and a DRAM (Dynamic Random Access Memory). The RAM 10E1 may also be configured to temporarily store at least some of commands of the computer program read out from the ROM 10E2. Note that, at least a part of the RAM 10E1 may be constituted by an LSI (Large Scale Integration) packaged integrally with the CPU 10P.

Figure 8:
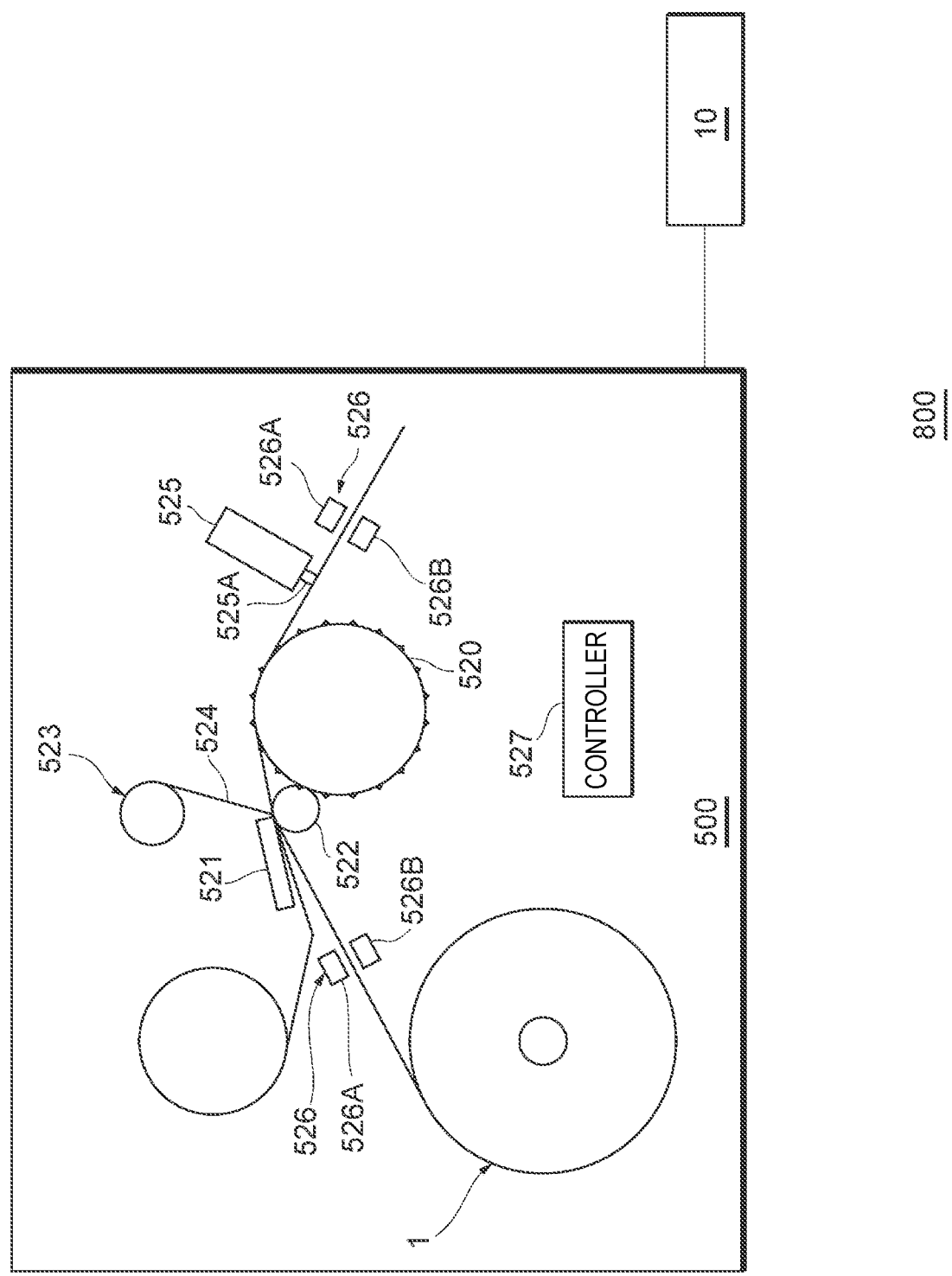
FIG. 8 is a block diagram showing a configuration of a printing system 800.

The communication unit 10N is an interface for connecting the apparatus 10 to other devices including a printer 500 (FIG. 8). The communication unit 10N may be connected to the communication network such as the Internet.

The input unit 10A is to receive an input of information from the user, and may include, for example, a keyboard, a mouse, a touch panel or a microphone.

The display unit 10D is a display configured to visually display results of computations performed by the CPU 10P, and may include, for example, an LCD (Liquid Crystal Display).

Hereinafter, operations that are performed when the CPU 10P of the apparatus 10 executes the shape setting program stored in the storage unit 10E are described.

Figure 3:
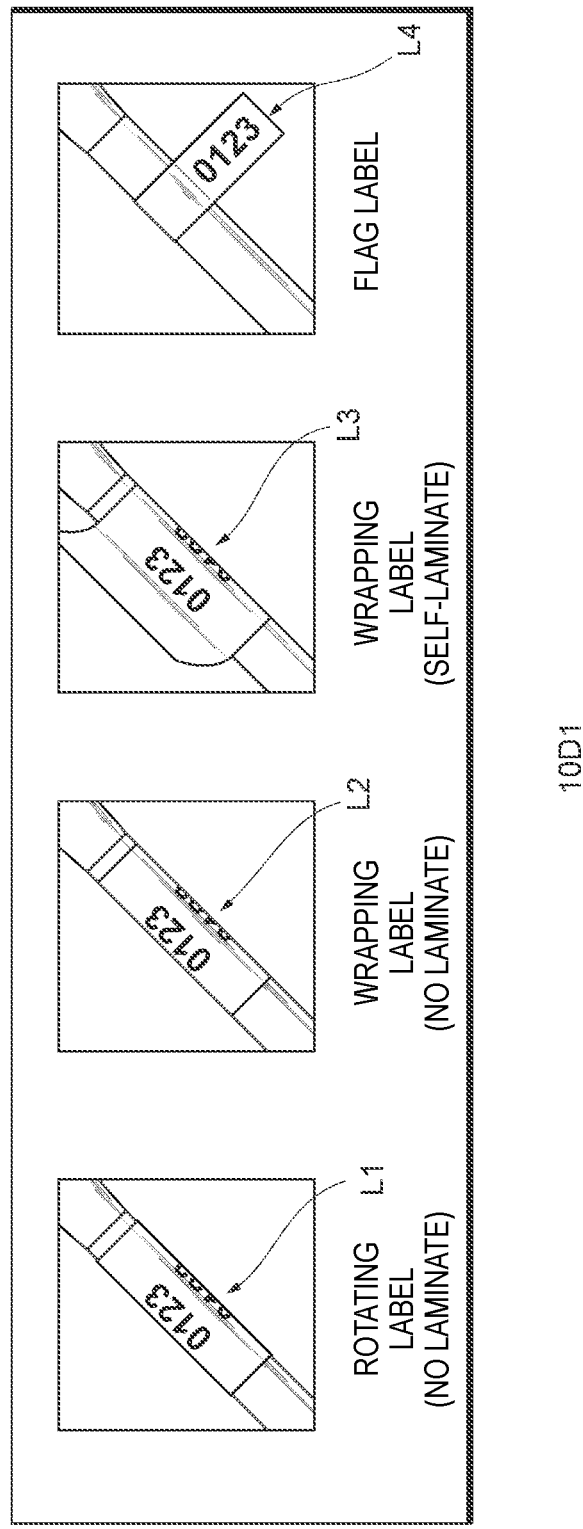
FIG. 3 shows a display screen 10D1 upon activation of a shape setting program.

FIG. 3 shows a display screen 10D1 on the display unit 10D that is displayed when the shape setting program is activated and executed by the CPU 10P. The shape setting program can set, for example, shapes of a label L1 that is a rotating label, a label L2 that is a wrapping label with no laminate, a label L3 that is a wrapping label with a laminate, and a label L4 that is a flag label. As shown in FIG. 3, any label can be wrapped around a cable. The CPU 10P is configured to display a plurality of types of labels on the display unit 10D by executing the shape setting program. The user selects one label from the plurality of types of labels by using the input unit 10A. The CPU 10P is configured to receive the selection on one label. A configuration of each of the labels L1 to L4 will be described later in detail.

[Rotating Label]

Figure 4:
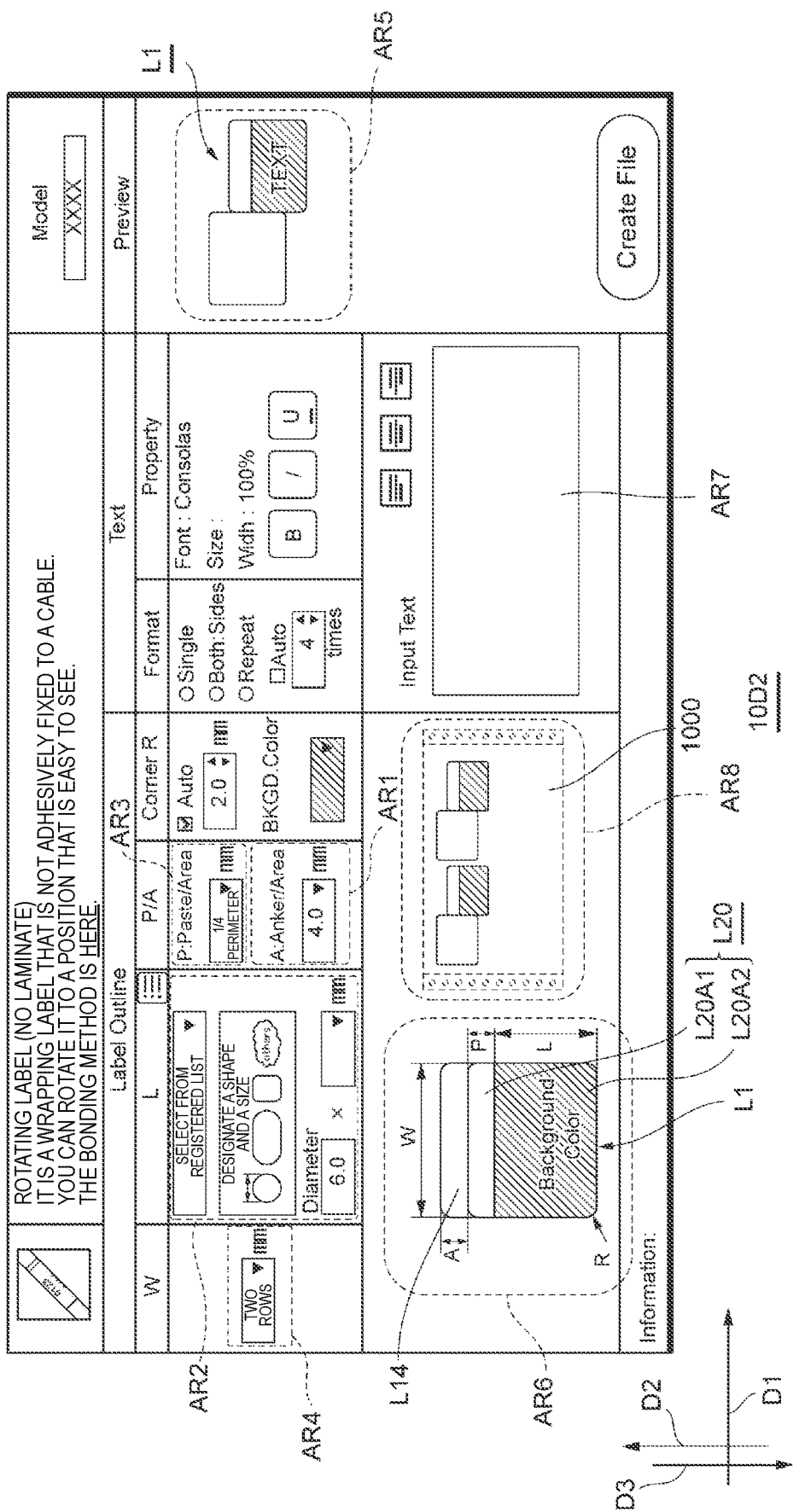
FIG. 4 shows a display screen 10D2 that is displayed when a label L1 is selected.

FIG. 4 shows a display screen 10D2 on the display unit 10D that is displayed when the label L1, which is a rotating label, is selected by the user. The label L1 has a characteristic configuration, as described later.

Figure 5:
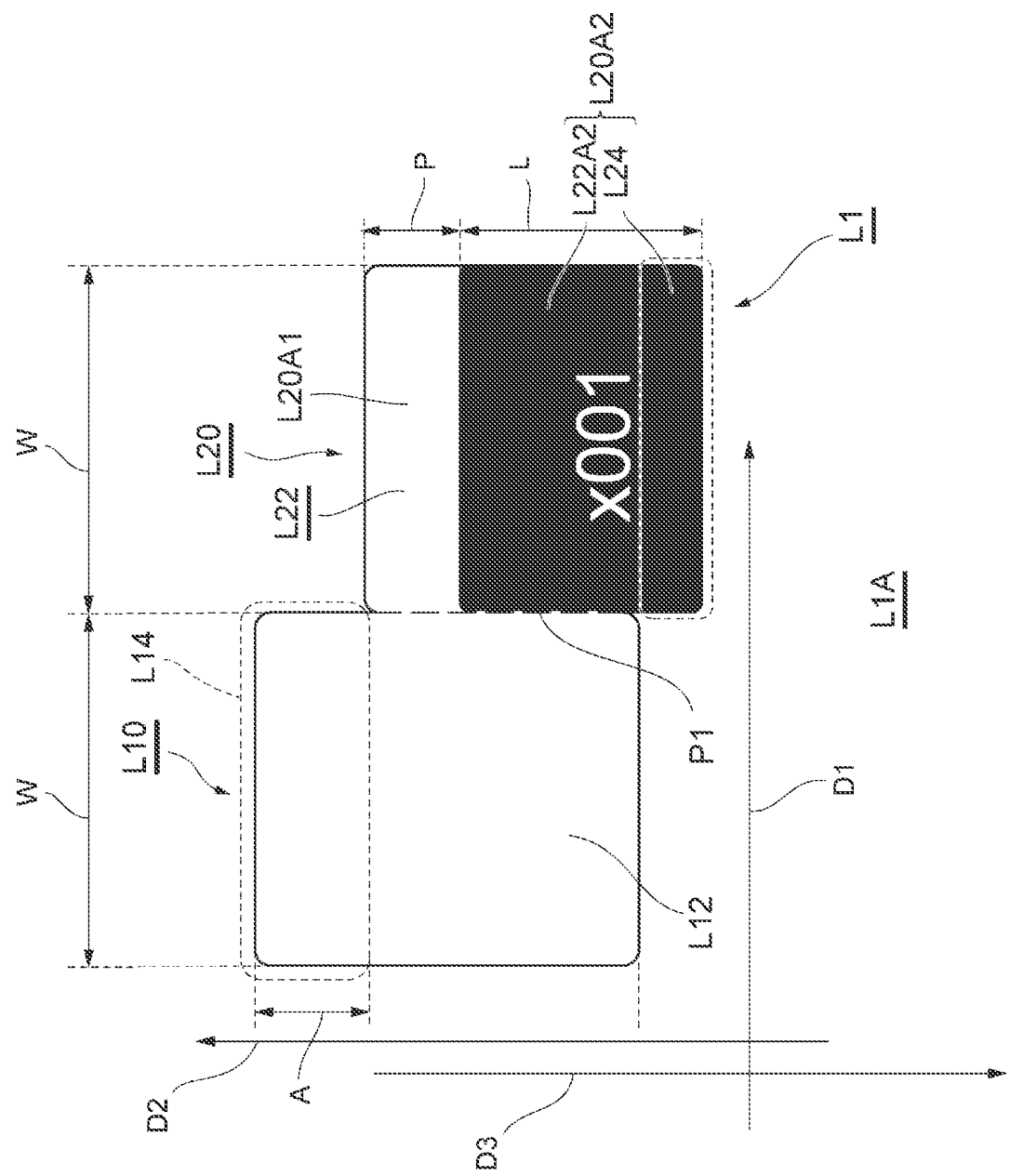
FIG. 5 shows a front surface L1A of the label L1.

FIG. 5 shows a front surface L1A of the label L1. For convenience, a right direction on the drawing sheet of FIG. 5 is defined as a first direction D1, an upward direction on the drawing sheet is defined as a second direction D2, and a downward direction on the drawing sheet is defined as a third direction D3. The second direction D2 and the third direction D3 are each orthogonal to the first direction D1. The second direction D2 and the third direction D3 are opposite directions. However, for quantities having no directions such as a height, a width and the like, the second direction D2 and the third direction D3 are used without identification, and may be shown in the drawings without identification of the directions. The second direction D2 may also be referred to as the third direction, and the third direction D3 may also be referred to as the second direction. The label L1 can be wrapped around a cable extending in the first direction D1.

The front surface L1A of the label L1 is a printable non-adhesive surface on which neither the bonding agent nor the adhesive is applied. The back surface is an adhesive surface on which the adhesive is applied. Therefore, the back surface can adhere to each other. The back surface can also adhere to the front surface L1A.

As shown in FIG. 5, the label L1 has a first part L10, and a second part L20 adjacent to the first part L10 in the first direction D1.

The first part L10 has a first bonding portion L12 connecting to the second part L20, and a first protruding portion L14 adjacent to the first bonding portion L12 in the second direction D2 and further protruding than the second part L20 in the second direction D2. As described later, the first protruding portion L14 functions as an anchor.

In the present embodiment, the first bonding portion L12 has a rectangular shape. The first protruding portion L14 adjacent to the first bonding portion L12 in the second direction D2 has a rectangular shape. However, since it is sufficient for the first protruding portion L14 to have a portion protruding in the second direction D2 with respect to the second part L20, the first protruding portion L14 is not limited to the rectangular shape. For example, the first protruding portion L14 may have a shape (for example, a triangular shape) whose width in the first direction D1 becomes smaller in the second direction D2.

The second part L20 has a second bonding portion L22 connecting to the first bonding portion L12, and a second protruding portion L24 adjacent to the second bonding portion L22 in the third direction D3 and further protruding than the first part L10 in the third direction D3.

In the present embodiment, the second bonding portion L22 has a rectangular shape. The second protruding portion L24 adjacent to the second bonding portion L22 in the third direction D3 has a rectangular shape. However, since it is sufficient for the second protruding portion L24 to have a portion protruding in the third direction D3 with respect to the first part L10, the second protruding portion L24 is not limited to the rectangular shape.

Further, a perforation P1 (an example of the "fold") extending in the second direction D2 is provided at a boundary between the first part L10 and the second part L20. The perforation P1 is formed by intermittently removing portions of the label 100. However, the fold may also be formed by forming a plurality of small holes penetrating the label 100. Note that, since the perforation P1 is simply provided so as to easily fold the label L1, it is not necessarily required. In addition, as used herein, the fold may include a "fold line" that can be easily folded by applying a pressure to a front surface of a label with a metal ball, a roller, a spatula or the like.

Hereinafter, a method of wrapping the label L1 around a cable extending in the first direction D1 is described.

First, the label L1 is folded along the perforation P1 to cause the back surface of the first bonding portion L12 and the back surface of the second bonding portion L22 to adhere to each other.

An area AR6 of FIG. 4 shows the front surface of the label L1 whose the back surface of the first bonding portion L12 and the back surface of the second bonding portion L22 adhere to each other by folding the label L1, when seeing the label L1 in a direction facing the second part L20. As shown in FIG. 4, the front surface on one side of the label L1 is provided at an end portion in the second direction D2 with an adhesive surface (the back surface of first protruding portion L14), and is provided with a non-adhesive surface (the front surface of the second part L20) adjacent to the adhesive surface in the third direction D3. Note that, the front surface on an opposite side is provided at an end portion in the third direction D3 with a different adhesive surface (the back surface of the second protruding portion L24) and is provided with a non-adhesive surface (the front surface of the first bonding portion L12) adjacent to the adhesive surface in the second direction D2.

Then, the back surface of the first protruding portion L14 of the label L1 is caused to adhere to a surface of the cable. At this time, the front surface of the second part L20 facing toward the same plane as the back surface of the first protruding portion L14 faces the surface of the cable.

Then, the label L1 is folded near a boundary between the first protruding portion L14 and the second part L20 so that the front surface of the second part L20 faces outward and the front surface of the first bonding portion L12 faces the surface of the cable. As a result, the front surface of the second part L20 faces outward.

Then, the label L1 is wrapped around the cable with the front surface of the second part L20 facing outward and the front surface of the first bonding portion L12 facing inward. At this time, the back surface of the first protruding portion L14 functions as an anchor adhering to the surface of the cable. For this reason, the label L1 can be easily wrapped around the cable.

Thereafter, the label L1 is moved relative to the cable to peel off the back surface of the first protruding portion L12 from the surface of the cable. Note that, this step may not be executed. The reason is that even though the step is not executed, the label L1 can be wrapped around the cable. This step may be executed when it becomes necessary to move the label L1 relative to the cable, as a rotating label.

Finally, the wrapping of the label L1 around the cable is completed by causing the back surface of the second protruding portion L24 to adhere to an overlap width portion at an end portion L20A1 of the second part L20 in the second direction D2.

The label L1 wrapped around the cable in this way can be moved in the extension direction of the cable and can be rotated in a circumferential direction of the cable by peeling off the first protruding portion L12 from the cable. In this way, since the label L1 can relatively move in the circumferential direction and extension direction of the cable around which the label is wrapped, it is referred to as a rotating label. According to the label L1, after the label is wrapped around the cable, an unnecessary portion to be discarded or a portion remaining on the cable can be eliminated. Further, the front surface L1A of the label L1 is a non-adhesive surface with no bonding agent and adhesive, and the back surface thereof is an adhesive surface with an adhesive. Therefore, it is not necessary to provide one surface with both the adhesive surface and the non-adhesive surface. Therefore, it is possible to easily manufacture the label L1 that can be wrapped around the cable.

The shape setting program of the present embodiment and the apparatus 10 configured to operate according to the shape setting program can set a shape of such label L1.

The CPU 10P causes the display unit 10D to display the display screen 10D2 for urging a user to input information for specifying a shape of the label L1, according to the shape setting program.

The present inventors noticed that a height A (an example of the "temporary fixed length information") of the first protruding portion L14 in the second direction D2 is important information for the label L1. Specifically, the first protruding portion L14 is peeled off from the cable after it is temporarily fixed to the cable and functions as an anchor. For this reason, if the height A of the first protruding portion L14 is too great, the first protruding portion L14 is difficult to be peeled off from the cable, so that the label L1 may not function as a rotating label. On the other hand, if the height A of the first protruding portion L14 is too small, the first protruding portion L14 is simply peeled off from the cable, so that it may not function as an anchor. Further, an optimal dimension of the height A is varied by a bonding force (adhesive force) of the adhesive provided on the back surface of the first protruding portion L14 with respect to a material of the surface of the cable. Therefore, the shape setting program is configured to permit the user to input information for setting the height A of the first protruding portion L14 in the second direction D2. Specifically, the CPU 10P displays information for urging the user to input the height A, in an area AR1 of the display screen 10D2, according to the shape setting program. The user can input the height A by using a keyboard, a mouse and the like provided for the input unit 10A. However, before the user inputs the height A, a representative height A may also be set in advance. Further, considering that the first protruding portion 14 can be easily peeled off, the height A is preferably set to be smaller than a half of a circumferential length of the cable. For this reason, a height A larger than the half of the circumferential length of the cable may be prohibited from being input. When the user inputs the height A, the information acquisition unit 10B (CPU 10P) receives and stores the input of the height A in the storage unit 10E.

Further, the shape setting program is configured to permit the user to input information for setting a height L of a display area L20A2 in the second direction D2, the display area L20A2 corresponding to an area, which is visually recognized from an outside when the label is wrapped around the cable and identification information of the cable and other information to be usefully given to an object around which the label is wrapped (hereinafter, referred to as "identification information and the like") can be printed therein, of the front surface of the label L1. Since the display area of the label L1 is wrapped around the cable, a circumferential length of the cable or a length greater than the circumferential length of the cable corresponds to the height L of the display area L20A2 in the second direction D2.

Specifically, the CPU 10P displays, in an area AR2 of the display screen 10D2, information for urging the user to input information (an example of the "display area length information") for specifying a cable such as a model number of the cable or information (an example of the "display area length information") for identifying a sectional shape of the cable, and information (an example of the "display area length information") indicative of a length of the cable in a predetermined direction (for example, the first direction D1 or the second direction D2) in a section of the cable such as a diameter of the cable. The user can input these information by using a keyboard, a mouse and the like. When the user inputs these information, the information acquisition unit 10B (CPU 10P) receives the input of the display area length information for setting a height of the display area L20A2 in the second direction D2, acquires the height L based on the same, and stores the height in the storage unit 10E. For example, when the information for specifying a cable such as a model number of the cable is input as the display area length information, the CPU 10P accesses the storage unit 10E, acquires the information indicative of the circumferential length L of the cable, based on the input information, and stores the same in the storage unit 10E. For example, when the information for identifying a sectional shape of the cable and the information indicative of a length in the first direction of a section of the cable are input as the display area length information, the CPU 10P calculates and acquires the information indicative of the circumferential length L, based on these information. For example, for a cable having a circular section and a diameter of 10 mm, the CPU 10P acquires a value obtained by multiplying 10 mm by π, as the information indicative of the circumferential length L, and stores the same in the storage unit 10E.

Further, the present inventors noticed that a height P (an example of the "overlap width length information") in the second direction D2 of an end portion L20A1 in the second direction D2 of the second part L20, to which an end portion in the third direction D3 of the second part L20 adheres, is important information for the label L1. Specifically, a front surface of the end portion L20A1 is an area to which the back surface of an end portion of the second part L20 in the third direction D3 adheres. For this reason, the end portion L20A1 does not correspond to the display area (an area that is visually recognized from an outside). However, if the height P of the end portion L20A1 in the second direction D2 is too small, the bonding force (adhesive force) is too weak, so that after wrapping the label L1 around the cable, the label L1 may be cut when moving the cable around which the label L1 is wrapped or rotating the label L1, depending on use environments (for example, a use environment where the cable is frequently inserted and pulled out with respect to a connector) and installed environments (for example, a high-temperature and high-humidity environment) of the cable. On the other hand, if the height P of the end portion L20A1 in the second direction D2 is too great, the use efficiency of a label sheet 1000 for printing the label L1 is lowered.

Therefore, the shape setting program is configured to permit the user to input information for setting the height P in the second direction D2 of the end portion L20A1 in the second direction D2. Specifically, the CPU 10P displays, in an area AR3 of the display screen 10D2, information for urging the user to input the height P. The user can input the height P by using a keyboard, a mouse and the like provided for the input unit 10A. The user can set an optimal height P, considering the use environments and the like of the cable. However, before the user inputs the height P, a representative height P may also be set in advance, based on the circumferential length L of the cable. When the user inputs the height P, the information acquisition unit 10B (CPU 10P) receives and stores the input of the height P in the storage unit 10E. When the user does not input the height P, the information acquisition unit 10B (CPU 10P) receives and stores an input of the preset height P in the storage unit 10E.

Further, the shape setting program of the present embodiment is configured to prohibit inputs of identification information, a background color and the like with respect to the end portion L20A1. By this configuration, it is possible to suppress ink or the like for displaying the identification information and the like of the cable from being applied to the front surface of the end portion L20A1. As a result, the adhesive is not directly applied to the front surface of the end portion L20A1 so as to apply ink or the like, so that it is possible to suppress a situation where the adhesive force is lowered and the label L1 is peeled off.

On the other hand, the shape setting program is configured to permit inputs of the identification information and the like to the display area L20A2. Specifically, the CPU 10P displays, in an area AR7 of the display screen 10D2, information for urging the user to input the identification information and the like including a character string for identifying a cable, and the like. The user can input a character string and the like on a plurality of rows, for example, by using the input unit 10A.

Further, the shape setting program is configured to permit the user to input label width information for setting a width W (an example of the "label width information") of the second part L20 in the first direction. The width W of the second part L20 in the first direction corresponds to a width of the label L1 when wrapping the label L1 around the cable. Specifically, the CPU 10P displays, in an area AR4 of the display unit 10D, information for urging an input of information indicative of the width W. The user can input the information indicative of the width W by using a keyboard, a mouse and the like. When the user inputs these information, the information acquisition unit 10B (CPU 10P) receives and stores the input of the width W in the storage unit 10E.

By executing the steps, the information acquisition unit 10B of the CPU 10P configured to operate according to the shape setting program receives the information for determining the height A, the height P, the height L and the width W. In addition, the information acquisition unit 10B receives the identification information and the like that are printed on the label L1. Note that, the input sequence of each of the information may be arbitrary. In the meantime, when the user does not input some information, preset values are received.

The shape setting unit 10C of the CPU 10P configured to operate according to the shape setting program is configured to set a shape of the label L1, based on the received information, and to store the same in the storage unit 10E, as shape data for setting a shape of the label L1 (including print data having the identification information and the like to be printed on the label L1; the same applies hereinafter). The label L1 having a set shape may also be displayed in an area AR5 of the display screen 10D2.

Further, the shape setting program is configured to cause the CPU 10P to display a label sheet 1000 for printing the label L1, and to arrange and display the label L1 (in a state before it is bent) defined by the height A, the height P, the height L and the width W in the label sheet 1000. Specifically, the CPU 10P displays, in an area AR8 of the display screen 10D2, a plurality of labels L1 positioned or arranged on the label sheet 1000 so that a conveying direction of the label sheet 1000 and the second direction D2 of the label L1 are substantially parallel to each other. The user can easily perceive how many the labels L1 can be arranged in the first direction D1 of the label sheet 1000 according to the current width W of the label L1. Further, for example, it is possible to determine whether the labels L1 can be arranged one more in the first direction D1 by slightly reducing the width W and whether the number of the labels L1 in the first direction D1 is not changed even by slightly increasing the width W. Therefore, the user can efficiently use the label sheet 1000, which is a print target of the label, by using the shape setting program and the apparatus 10.

Further, according to the shape setting program and the apparatus 10 of the present embodiment, the user can set the width and height of the display area L20A2. For this reason, the user can set the width W equivalent to a width of the display area L20A2 to be greater than the height L of the display area L20A2 or to be smaller than the height L. Therefore, for example, in a case where there is information that the user wants to divide and print into a plurality of rows, such as a case where the user wants to print the identification information for identifying a cable on a first row and to print different information about the cable (for example, information indicative of a replacement timing of the cable) on a second row, according to the shape setting program and the apparatus 10 of the present embodiment, it is possible to print the desired information in a desired aspect by setting the width and height of the display area L20A2 in conformity to the number of characters, the number of rows and the like of the information to be printed on each row. On the other hand, according to a label of the related art where at least one of the height and the width in predetermined directions is set in advance, it is difficult to print the information in a desired aspect.

In addition, according to the shape setting program and the apparatus 10 of the present embodiment, the user can easily determine a label shape simply by inputting the information for determining the height A, the height P, the height L and the width W. Therefore, even for a label having a complex shape such as the label L1, it is possible to easily set a shape thereof. However, the present embodiment does not prevent an input of the information (for example, the information of defining a background color of the display area L20A2, the information defining the character size, the font and the roundness R of a corner portion of the label included in the identification information and the like, and the like) other than the above information. Further, these information can also be input by dragging a part of the label L1 displayed on the display unit 10D with a mouse (or a touch panel).

Additionally, the CPU 10P displays a state before the label L1 is folded along the perforation P1, in the area AR5 of the display screen 10D2, and displays a state after the label L1 is folded, in the area AR6, according to the shape setting program. Therefore, the user can easily perceive how to bend the label L1 and to wrap the same around the cable.

Note that, the shape setting program may also be configured to be able to set a self-laminating rotating label having a laminate portion for covering a printed portion, as a modification of the label L1. In this case, the second bonding portion L22 corresponds to the display area L20A2. The second protruding portion L24 corresponds to the laminate portion. The shape setting program may also be configured to permit the user to set a length of the display area L20A2 in the second direction D2 and a length of the second protruding portion L24 in the second direction D2.

[Self-Laminating Wrapping Label]

Figure 6:
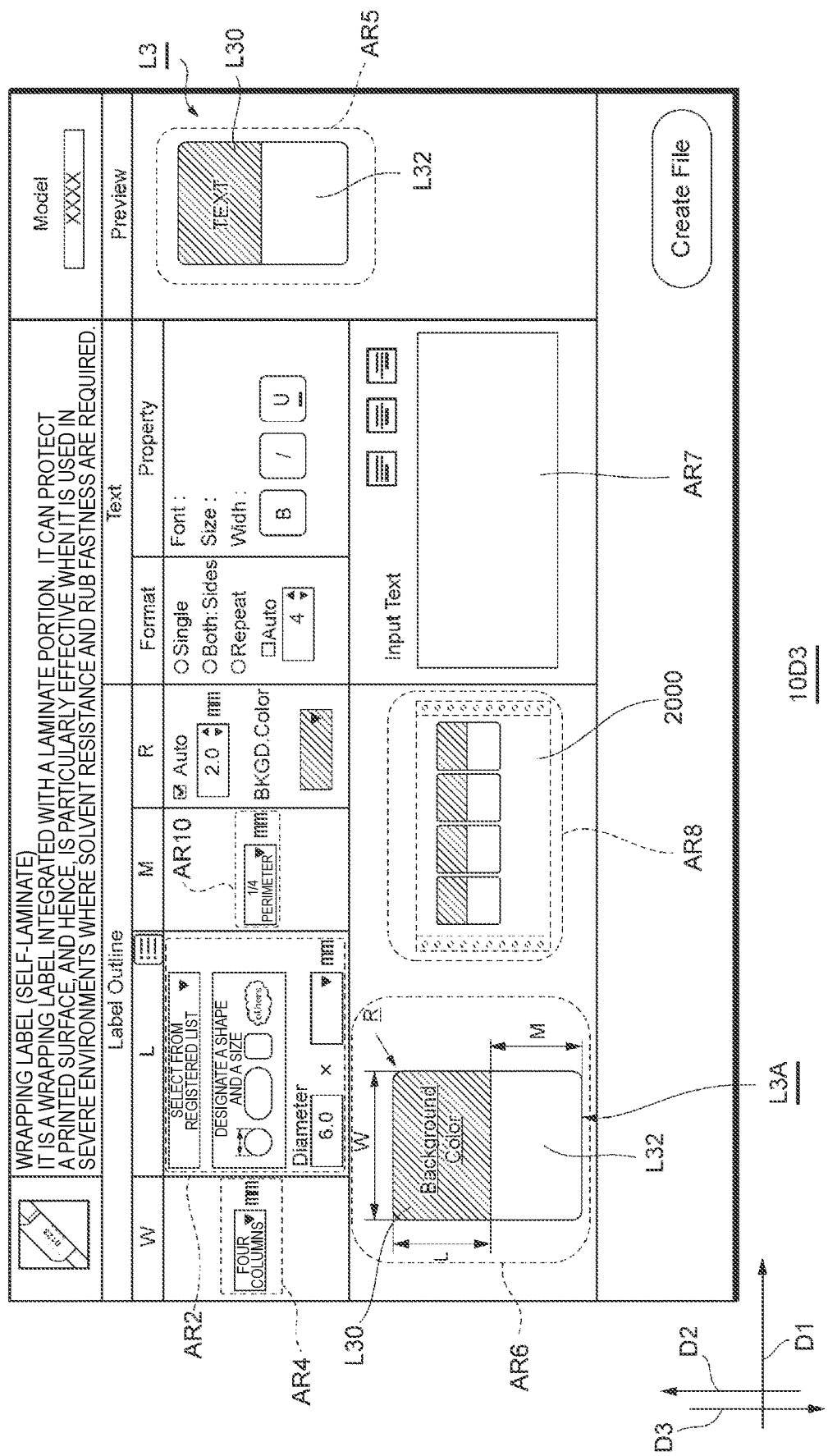
FIG. 6 shows a display screen 10D3 that is displayed when a label L3 is selected.

FIG. 6 shows a display screen 10D3 of the display unit 10D that is displayed when a label L3, which is a self-laminating wrapping label, is selected. The constitutional elements that are rationally understood to show the same or similar configurations as or to the configurations described with respect to the label L1 are denoted with the same reference signs, the detailed descriptions thereof are omitted, and the different matters are mainly described.

A front surface L3A of the label L3 (FIG. 6) is a printable non-adhesive surface on which neither the bonding agent nor the adhesive is applied. A back surface is an adhesive surface on which the adhesive is applied. Therefore, the back surface can adhere to each other. The back surface can also adhere to the front surface L3A.

The label L3 has a label portion L30 that is wrapped around a cable extending in the first direction D1, and a laminate portion L32 adjacent to the label portion L30 in the second direction D2.

The label portion L30 is a portion that adheres to a surface of the cable. The laminate portion L32 is transparent, and is wrapped on the front surface of the label portion L30 to protect the identification information and the like of the cable printed on the label portion L30. Therefore, the label portion L30 corresponds to the display area.

The shape setting program and the apparatus 10 of the present embodiment can set a shape of the label L3. The CPU 10P displays, on the display unit 10D, a display for urging the user to input information for specifying a shape of the label L3, according to the shape setting program.

The present inventors noticed that a height M (an example of the "laminate length information") of the laminate portion L32 in the second direction D2 is important information for the label L3. Specifically, the laminate portion L32 is wrapped on the front surface of the label portion L30 to protect the identification information and the like of the cable printed on the label portion L30. Therefore, it may be considered that it is sufficient if the height M is set to be the same as a height L (an example of the "display area length information") of the label portion L30 in the second direction D2. However, it may be preferable to doubly wind the laminate portion L32 for protection, for example, depending on the use environments of the label L3. In this case, the portion that is doubly wound may be set longer than a single-layered portion, considering a thickness of the label. However, if the height M of the laminate portion L32 is set too great, it is difficult to efficiently use a label sheet 2000 on which the label L3 is printed. Therefore, the shape setting program of the present embodiment is configured to permit the user to input information for setting the height M. Specifically, the CPU 10P displays, in an area AR10 of the display screen 10D3, information for urging the user to input the height M, according to the shape setting program. The user can input the height M by using a keyboard, a mouse and the like provided for the input unit 10A. However, before the user inputs the height M, a representative height M may also be set in advance.

By the configuration where it is possible to set an outer shape of a label in conformity to a size of each cable, the user can set the height M according to an area that the user wants to protect. For example, the user may set so that the identification information and the like of the cable are to be printed only on an upper portion (an end portion in the second direction D2) of the label portion L30, and at the same time, may set the height M to be 1.5 times, 1.25 times and the like as large as the height L, not two times of the height L so that only an area to be protected, in which the identification information and the like of the cable are printed, is to be doubly protected. By such setting, it is possible to protect the identification information and the like in a similar manner to the related art while suppressing the length of the laminate portion L32 to a half or smaller, as compared to the related art, for example.

Further, the shape setting program is configured to be able to set a candidate for the height M, based on the height L of the label portion L30 in the second direction D2. For example, the height M is displayed so that quantities of one time, 1.25 times, 1.5 times and 2 times of the height L can be selected in a pull-down format. In the area AR10 of FIG. 6, 1.25 times of the height L is selected as the height M, as an example. In this way, the shape setting program displays a plurality of candidates for the height M, which are set based on the height L, in a selectable aspect. The user can easily select an appropriate height M.

The descriptions of the input (area AR4) of the width W (an example of the "label width information") of the label portion L30 in the first direction D1, the input (area AR2) of the height L (an example of the "display area length information") of the label portion L30 in the second direction D2 and the input (area AR7) of the identification information and the like of the cable to be printed on the label portion L30 are omitted because the inputs can be understood in a similar aspect to the case of the label L1.

According to the shape setting program and the apparatus 10 of the present embodiment, since the user can set the width and height of the label portion L30 corresponding to the display area of the label L3, the user can set the width W of the label portion L30 to be greater than the height L or to be smaller than the height L. Therefore, as described above, for example, it is possible to print the information on a plurality of rows. The descriptions of the operational effects that are expressed in a similar manner to the case of setting a shape of the label L1 are omitted.

By executing the above steps, the information acquisition unit 10B of the CPU 10P configured to operate according to the shape setting program receives the information for setting the height M, the height L and the width W in no particular order. The information acquisition unit 10B also receives the identification information and the like that are printed on the label L3. The shape setting unit 10C of the CPU 10P configured to operate according to the shape setting program sets a shape of the label L3 based on the received information, and stores the same in the storage unit 10E, as shape data of the label L3. The label L3 having a set shape may also be displayed in the area AR5 of the display screen 10D3.

Further, the CPU 10P displays the label sheet 2000 for printing the label L3 in the area AR8 of the display screen 10D3, and also arranges and displays the label L3 having the height M, the height L and the width W in the label sheet 2000, according to the shape setting program. More specifically, the CPU 10P arranges and displays the label L1 in the label sheet 2000 in the area AR8 of the display screen 10D3 so that the conveying direction of the label sheet 2000 and the second direction D2 of the label L3 are substantially parallel to each other. Therefore, the user can efficiently use the label sheet 2000, which is a print target, by adjusting the width W and the like of the label L3.

Second Embodiment of Self-Laminating Wrapping Label

Hereinafter, a second embodiment of the self-laminating wrapping label is described. Note that, the parts that can be understood to have similar configurations to another embodiment by one skilled in the art are denoted with the similar names, the descriptions thereof are omitted or simplified, and the different parts are mainly described.

The present inventors noticed that when a label is wrapped around a dark-colored cable such as red and black, the color of the cable may be transparent, and particularly, when the self-laminating wrapping label is wrapped, the color of the cable is easily transparent. When the color of the cable is transparent, the identification information and the like printed in the display area is difficult to see, so that the function as the label may not be fully fulfilled. According to the study, since the self-laminating wrapping label has transparency, it is considered that one of causes is that only an ink layer of the background color of the display area hinders color transmission of the cable.

Therefore, the self-laminating wrapping label of the present embodiment is a label having a front surface and a back surface provided on an opposite side to the front surface and capable of being wrapped around a cable extending in a first direction, wherein the label has three portions of a colored portion to be wrapped around the cable, a label portion adjacent to the colored portion in a second direction perpendicular to the first direction, having a display area and to be wrapped on the colored portion, and a laminate portion adjacent to the label portion in the second direction and to be wrapped on the label portion.

Specifically, the wrapping label of the present embodiment can be constituted by adding the colored portion adjacent to the label portion L30 in the second direction D2 to the label L3 (providing the colored portion on the opposite side to the laminate portion L32).

By adding the colored portion and wrapping the colored portion around the cable, it is possible to suppress the color transmission of the cable.

As the color of the colored portion, for example, a color in a light-colored system such as white and gray or the same color as the background color of the display area is preferable. By coloring a color in a light-colored system or the same color as the background color of the display area by printing or the like, it is possible to suppress the color transmission of the cable, and to suppress a situation where the color of the colored portion is transparent, and hence, the identification information and the like printed on the display area are difficult to see.

Preferably, the width of the colored portion in the first direction D1 is the same as the width W of the label portion L30 in the first direction D1, and the height in the second direction D2 is the same as the height L of the label portion L30 in the second direction D2.

The computer program for setting the label shape is configured to cause a computer to execute a step of receiving an input of label width information for setting a width of the label portion in the first direction, a step of receiving an input of display area length information for setting a height of the label portion in the second direction, a step of receiving an input of laminate length information for setting a height of the laminate portion in the second direction, and a step of setting a label shape, based on the input label width information, display area length information and laminate length information.

When a width of the colored portion in the first direction D1 and a height thereof in the second direction D2 are not input, the same width and height as those of the label portion may be set as the width and height of the colored portion.

[Flag Label]

Figure 7:
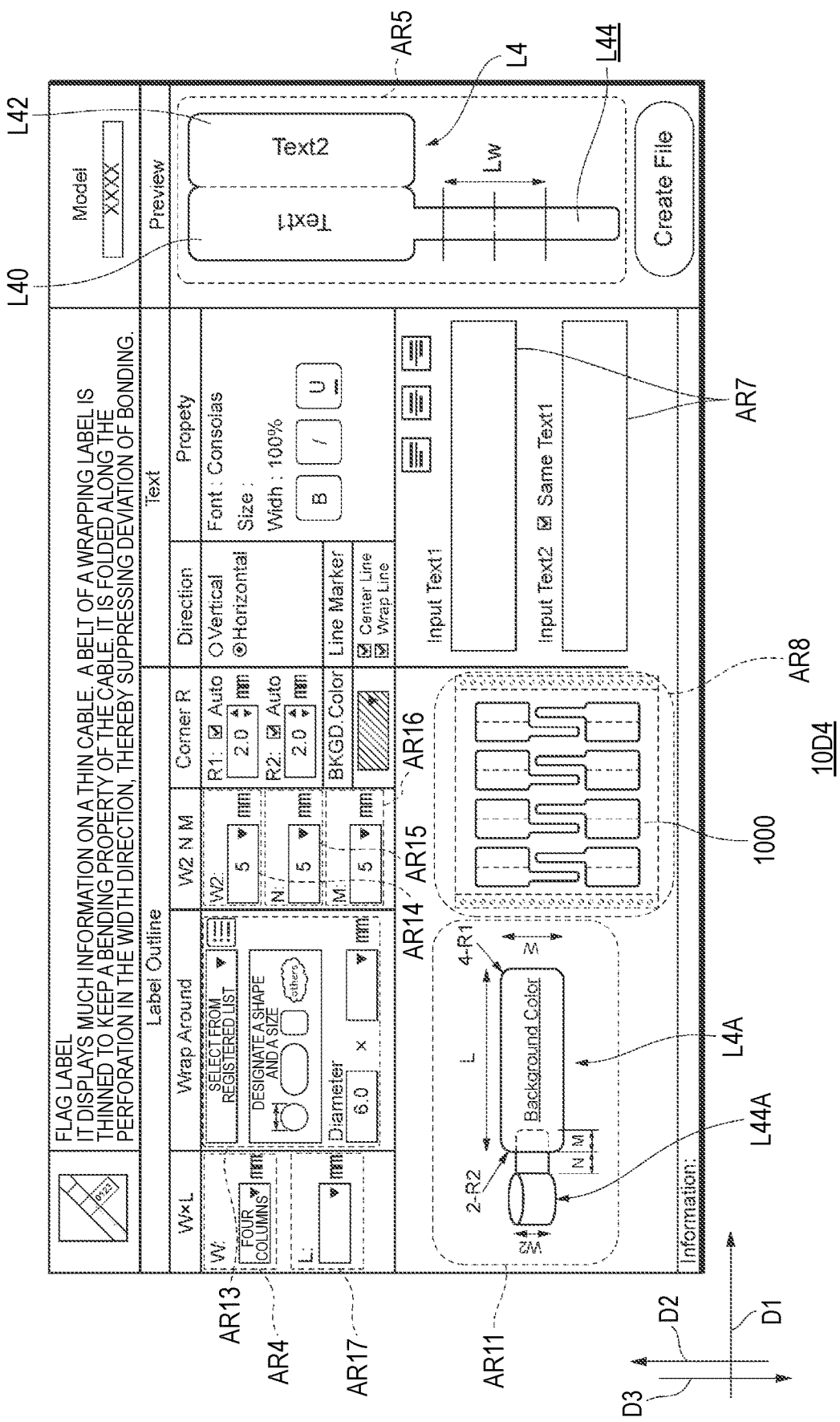
FIG. 7 shows a display screen 10D4 that is displayed when a label L4 is selected.

FIG. 7 shows a display screen 10D4 of the display unit 10D that is displayed when a label L4 that is a flag label is selected. The constitutional elements that are rationally understood to show the same or similar configurations as or to the configurations described with respect to the label L1 or the label L3 are denoted with the same reference signs, the detailed descriptions thereof are omitted, and the different matters are mainly described. Note that, in FIG. 7, the directions of the label L4 displayed in the area AR5 and the label L4 displayed in the area AR11 are changed by 90°. The first direction D1, the second direction D2 and the third direction D3 shown in FIG. 7 are based on the label L4 displayed in the area AR5. In addition, for convenience, the downward direction on the drawing sheet is referred to as the second direction D3, and the upward direction is referred to as the third direction D2.

A front surface L4A of the label L4 is a printable non-adhesive surface on which neither the bonding agent nor the adhesive is applied. A back surface is an adhesive surface on which the adhesive is applied. Therefore, the back surface can adhere to each other. The back surface can also adhere to the front surface L4A.

The label L4 has a first label portion L40 corresponding to the display area that is visually recognized from an outside and the identification information and the like can be printed thereon, a second label portion L42 adjacent to the first label portion L40 in the first direction D1 and corresponding to a second display area, and a leg portion L44 adjacent to the first label portion L40 in the second direction D and having a width smaller than a width of the first label portion L40 in the first direction D1 so as to wrap around the cable.

The shape setting program and the apparatus 10 of the present embodiment is configured to set a shape of the label L4. The CPU 10P displays, on the display unit 10D, a display for urging the user to input information for specifying a shape of the label L4, according to shape setting program.

The present inventors noticed that a width W2 (an example of the "wrapping portion width information") of the leg portion L44 in the first direction D1 is important information for the label L4. Specifically, since the leg portion L44 (including the wrapping portion L44A) is a portion that adheres to the surface of the cable, the width W2 is important to set the bonding force (adhesive force) of the label L4 to the cable. Note that, the greater the width W2 is, the greater the bonding force (adhesive force) is, so that it is not always preferable. For example, if the width W2 is set too great, the cable may not be bent into a desired shape at a portion around which the label L4 is wrapped. Therefore, it may be preferable that the width W2 is not set too great, depending on the use environments of the cable, and the like. Therefore, the shape setting program is configured to permit the user to input information for setting the width W2 of the leg portion L44 in the first direction D1. Specifically, the CPU 10P displays, in an area AR14 of the display screen 10D4, information for urging an input of the width W2. The user can input the width W2 by using a keyboard, a mouse and the like provided for the input unit 10A. However, before the user inputs the width, a representative width W2 may also be set in advance. When the user inputs the width W2, the information acquisition unit 10B (CPU 10P) receives and stores the input of the width W2 in the storage unit 10E.

The shape setting program is also configured to permit the user to input information of a height Lw of the wrapping portion L44A in the second direction D2, which faces and adheres to the surface of the cable and adheres, of the leg portion L44 of the label L4. Specifically, the CPU 10P displays, in an area AR13 of the display screen 10D4, information for urging the user to input information (an example of the "wrapping portion length information") for specifying a cable such as a model number of the cable or information (an example of the "wrapping portion length information") for identifying a sectional shape of the cable, and information (an example of the "wrapping portion length information") indicative of a length of the cable in a predetermined direction (for example, the first direction D1 or the second direction D2) in a section of the cable such as a diameter of the cable. The user can input these information by using a keyboard, a mouse and the like. When the user inputs these information, the information acquisition unit 10B (CPU 10P) receives an input of the wrapping portion length information for setting a height of the wrapping portion L44A in the second direction D2, and acquires and stores the height Lw in the storage unit 10E. Since the method of acquiring the height Lw is similar to the above-described method, the description thereof is omitted.

The present inventors also noticed that a neck length N (an example of the "neck length information") for setting an interval in the second direction D2 between the wrapping portion L44A of the leg portion L44 and the first label portion L40 is important information for the label L4. Specifically, if the neck length N is too great, the first label portion L40 and the second label portion L42 hang down, so that it is difficult to visually recognize the identification information and the like printed on the first label portion L40 and the like. On the other hand, if the neck length N is too small, the stiffness is too high, so that the first label portion L40 and the like interferes with an adjacent cable and other obstacle, depending on the use environments. Therefore, the shape setting program is configured to permit the user to input information for setting the neck length N. Specifically, the CPU 10P displays, in an area AR15 of the display screen 10D4, information for urging the user to input the neck length N. The user can input the neck length N by using a keyboard, a mouse and the like provided for the input unit 10A. When the user inputs the information, the information acquisition unit 10B (CPU 10P) receives and stores the input of the neck length N in the storage unit 10E.

The shape setting program is also configured to permit the user to input information (area AR16) for setting the height M (an example of the "overlapping margin information") in the second direction D2 of a portion of the leg portion L44 sandwiched by the first label portion L40 and the second label portion L42, information (area AR4) for setting the width W (an example of the "label width information") of the first label portion L40 in the first direction D1 and information ("area AR17") for setting the height L in the second direction D2. When the user inputs these information, the information acquisition unit 10B (CPU 10P) receives and stores the inputs of these information in the storage unit 10E.

Note that, the shape setting program may also be configured to permit the user to set a position in which a notch, which is a fold of the leg portion L44, is provided. The user can sandwich an end portion of the leg portion L44 having a desired height M by the first label portion L40 and the second label portion L42 by folding the leg portion L44 on the basis of the notch.

By executing the above steps, the information acquisition unit 10B of the CPU 10P configured to operate according to the shape setting program receives the information for setting the width W2, the height Lw, the neck length N, the height M, the width W and the height L in no particular order, and the shape setting unit 10C acquires the shape data for setting a shape of the label L4 based on the received information, and stores the same in the storage unit 10E. In addition, the label L4 having a set shape is displayed in the area AR5 of the display screen 10D4.

Further, the CPU 10P displays a label sheet 1000 for printing the label L4 and arranges and displays the label L4 having a shape set as described above in the label sheet 1000, according to the shape setting program. Therefore, the user can efficiently use the label sheet 1000 that is a print target of the label L4.

Further, according to the shape setting program and the apparatus 10 of the present embodiment, as described above, it is possible to easily set the label shape. In addition, since the user can set the widths and heights of the first label portion L40 and the second label portion L42, which are the display area of the label L4, it is possible to print different information on a plurality of rows, for example, as described above.

As described above, according to the shape setting program of the present embodiment and the apparatus 10 configured to operate according to the shape setting program, the user can easily set a label having a shape corresponding to the desired information.

[Printing Apparatus and Printing System]

Hereinafter, a printer 500 and a printing system 800 of the present embodiment are described.

FIG. 8 is a schematic view showing a configuration of a printing system 800 including a printer 500 (an example of the "printing apparatus") and the apparatus 10 connected to the printer 500. The printer 500 is a cutting printing machine capable of providing a label sheet having a plurality of sheets such as the label L1, the label L2, the label L4 or the like by performing printing on a print medium 1 and half cutting the label sheet according to label shape data.

The print medium 1 has a label sheet and a release paper bonded to the label sheet. The label sheet and the release paper are stacked. The label sheet is made of printable paper or film, and a back surface thereof is provided with an adhesive for adhesion to the release paper in a layer shape. The label sheet may be a laminate paper or a laminate film.

Both ends of the print medium 1 in a width direction are each formed with a plurality of through-holes provided at equal intervals in a longitudinal direction. The print medium 1 of the present embodiment has a width of 10 cm or larger so that a plurality of labels can be formed in the width direction, for example. The print medium 1 is mounted to the printer 500 in a state of being wound in a circular ring shape having an axis in the width direction.

The printer 500 includes an accommodation unit for rotatably accommodating the print medium 1 wound in a roll shape, and a pair of sprockets 250 (an example of the "conveying unit") for conveying the print medium 1 in the longitudinal direction by rotating in a state of engaging with the through-holes formed at both end portions of the print medium 1 in the width direction. The printer 500 further includes a thermal head 521 (an example of the "printing unit") configured to apply thermal energy and a platen 522 arranged to face the thermal head, on an upstream side of the sprockets 520 with respect to the conveying direction of the print medium 1. The thermal head 521 is configured to apply the thermal energy to the print medium 1 based on print data that is printed on the label. An ink ribbon cartridge 523 is mounted to the printer 500. An ink ribbon 524 of the ink ribbon cartridge 523 is arranged between the thermal head 521 and the platen 522. When the thermal head 521 applies the thermal energy based on the print data, dye (ink) included in the ink ribbon 524 is transferred to the label sheet of the print medium 1, so that printing can be performed according to the print data.

The printer 500 includes a cutting mechanism 525 (an example of the "cutting unit") configured to cut the print medium 1, on a downstream side of the sprockets 520. The cutting mechanism 525 has, for example, a cutter 525A configured to be movable in the width direction of the print medium 1. The cutter 525A moves in the width direction of the print medium and the print medium 1 is conveyed in the longitudinal direction according to the shape data, so that the print medium 1 is half cut. Specifically, the cutter 525A performs cutting so as to penetrate the label sheet in a stacking direction of the print medium 1 without penetrating the release paper. Note that, the cutter 525A can also form the perforation by reciprocally moving in a direction perpendicular to a front surface of the print medium 1.

The printer 500 further includes a remaining amount detecting sensor 526 for detecting a remaining amount of the print medium 1. The remaining amount detecting sensor 526 has a light emitting unit 526A and a light receiving unit 526B arranged to face the light emitting unit.

The printer 500 includes a control unit 527 on which a microcomputer is mounted. The control unit 527 is configured to control a motor configured to drive the sprockets 520, the cutting mechanism 525, the thermal head 521, and the like.

Note that, the printer 500 is not limited to the configuration where the thermal head 521 is provided, and may be any apparatus that can perform printing on the print medium 1 and cut the print medium 1 into a predetermined shape. For example, a printer having an inkjet head configured to print the identification information and the like on the print medium 1 by ejecting ink by using a Piezo device or the like or a laser printer can also be used.

The printer 500 is communicatively connected to the apparatus 10 via the communication unit 10N. The control unit 527 of the printer 500 is configured to be able to acquire the shape data (including print data for printing the identification information and the like) of the label L1 and the like stored in the storage unit 10E of the apparatus 10 via the communication unit 10N. The control unit 527 is configured to generate control data for operating the thermal head 521 based on the acquired print data, and to transmit the control data to the thermal head. For this reason, it is possible to perform printing on the print medium 1 according to the identification information and the like. The control unit 527 is also configured to generate control data for operating the cutter 525A of the cutting mechanism 525 based on the acquired shape data, and to transmit the control data to the cutting mechanism 525. For this reason, it is possible to cut (half cut) the print medium 1 according to the shape data.

Note that, the printer 500 and the apparatus 10 may be connected by the communication network such as the Internet. The printer 500 and the apparatus 10 may not be connected. For example, the shape data set using the apparatus 10 may be stored in a storage medium such as an SD card, a USB memory and the like, and may be read into the printer 500, so that the printer 500 acquires the shape data. In this case, the printer 500 may have an SD card slot and an SD card reader for mounting and reading the SD card. The printer 500 and the apparatus 10 may also be integrated.

Note that, the shape data may include position information for specifying a cutting position on the print medium 1. In this case, the shape setting program may generate the shape data sop that the longitudinal direction, which is the conveying direction of the print medium 1, and the second direction of the label are substantially parallel. By this configuration, when peeling off the release paper from the label sheet of the print medium 1, a peeling direction of the release paper (the longitudinal direction of the print medium 1) and a part of an outline of the label become parallel, so that it is possible to smoothly peel off the release paper from the label sheet.

The printer 500 can half cut the label sheet of the print medium 1 based on the shape data generated using the apparatus 10, thereby easily providing a label sheet on which a plurality of labels each having a user's desired shape is formed. Further, the printer 500 can efficiently arrange a plurality of labels on a label sheet by generating the shape data with the apparatus 10.

In the label shown in each embodiment, the adhesive surface is formed by providing the adhesive. However, the adhesive surface may also be formed by providing the bonding agent or the like. However, when the adhesive surface is provided by the adhesive that is not solidified at room temperatures, it is possible to provide a rotating label that can easily rotate relative to a cable.

The present disclosure can be diversely modified without departing from the gist thereof. For example, some constitutional elements in any embodiment can be added to other embodiments within a normal conceivable range of one skilled in the art. In addition, some constitutional elements in any embodiment can be replaced with corresponding constitutional elements in other embodiments.

The aforementioned embodiments are summarized as follows.

A non-transitory computer-readable medium of the embodiments stores a computer program for setting a shape of a label having a front surface and a back surface provided on an opposite side to the front surface and capable of being wrapped around a cable extending in a first direction. The label has: a first part; and a second part adjacent to the first part in the first direction. The first part has a first protruding portion further protruding than the second part in a second direction perpendicular to the first direction and having a first adhesive surface on the back surface, and the second part has a second protruding portion further protruding than the first part in a third direction opposite to the second direction and having a second adhesive surface on the back surface. The computer program causes a computer to execute: receiving an input of label width information for setting a width of the second part in the first direction; receiving an input of display area length information for setting a height in the second direction of a display area of the second part; receiving an input of overlap width length information for setting a height in the second direction of an overlap width area of the second part, an end portion of the display area in the third direction being capable of adhering to the overlap width area; receiving an input of temporary fixed length information for setting a height of the first protruding portion in the second direction; and setting a shape of the label, based on the input label width information, display area length information, overlap width length information and temporary fixed length information.

Note that, the display area length information for setting the height of the display area in the second direction may include information for designating a sectional shape of a cable that is a wrapping target.

A non-transitory computer-readable medium of the embodiments stores a computer program for setting a shape of a label having a front surface and a back surface provided on an opposite side to the front surface and capable of being wrapped around a cable extending in a first direction. The label has: a first label portion comprising a first display area; a second label portion adjacent to the first label portion in the first direction and comprising a second display area; and a leg portion adjacent to the first label portion in a second direction perpendicular to the first direction and having a width smaller than a width of the first display area in the first direction so as to wrap around the cable. The computer program causes a computer to execute: receiving an input of label width information for setting a width of the first label portion in the first direction; receiving an input of wrapping portion width information for setting a width of the leg portion in the first direction; receiving an input of wrapping portion length information for setting a height in the second direction of a wrapping portion of the leg portion, the wrapping portion facing a surface of the cable when wrapped around the cable; receiving an input of neck length information for setting an interval in the second direction between the wrapping portion of the leg portion and the first label portion; and setting a shape of the label, based on the input label width information, wrapping portion width information, wrapping portion length information and neck length information.

A non-transitory computer-readable medium of the embodiments stores a computer program for setting a shape of a label having a front surface and a back surface provided on an opposite side to the front surface and capable of being wrapped around a cable extending in a first direction. The label has: a label portion comprising a display area and configured to be wrapped around the cable; and a laminate portion adjacent to the label portion in a second direction perpendicular to the first direction and configured to be wrapped on the label portion. The computer program causes a computer to execute: receiving an input of label width information for setting a width of the label portion in the first direction; receiving an input of display area length information for setting a height of the label portion in the second direction; receiving an input of laminate length information for setting a height of the laminate portion in the second direction; and setting a shape of the label, based on the input label width information, display area length information and laminate length information.

A non-transitory computer-readable medium of the embodiments stores a computer program for setting a shape of a label having a front surface and a back surface provided on an opposite side to the front surface and capable of being wrapped around a cable extending in a first direction. The label has: a color portion that is colored and is wrapped around the cable; a label part that is adjacent to the color portion in a second direction perpendicular to the first direction, includes a display area, and is configured to be wrapped around the color portion; and a laminate portion adjacent to the label portion in the second direction and configured to be wrapped on the label portion. The computer program causes a computer to execute: receiving an input of label width information for setting a width of the label portion in the first direction; receiving an input of display area length information for setting a height of the label portion in the second direction; receiving an input of laminate length information for setting a height of the laminate portion in the second direction; and setting a shape of the label, based on the input label width information, display area length information and laminate length information.

The computer programs may be for setting the label shape formed by cutting the label sheet that adheres to the release paper. Further, the computer programs may cause the computer to further execute a step of arranging a label having a set shape in the label sheet and displaying the same on the display so that the longitudinal direction of the label sheet and the second direction are substantially parallel to each other.

The computer programs can be recorded and stored in a non-transitory storage medium (including a non-volatile semiconductor storage medium such as a NAND flash memory, an MRAM, an ReRAM and the like to be mounted on an SD card, and SSD and the like, and a magnetic storage medium such as an HDD).

As used herein, "substantially parallel" means that an angle between the longitudinal direction of the label sheet and the second direction is 10° or smaller.

In addition, the "label sheet" includes a paper sheet having a front surface on which characters, symbols, figures or the like can be printed, and particularly, includes transparent laminating paper and a film made of a resin material such as PVC (PolyVinyl Chloride), PET (PolyEthylene Terephthalate) and synthetic paper. Further, a back surface of the paper sheet such as laminate paper, PVC film, PET film and synthetic paper may be provided with an adhesive layer.

The "adhesive surface" indicates a surface on which at least one of a bonding agent and an adhesive is provided. Note that, in the present disclosure, the bonding agent means adhering to another object by solidifying to express joint strength at room temperatures, and the adhesive means adhering to another object without solidifying at room temperatures. In the present disclosure, the adhesive surface includes all of a surface on which only the adhesive is provided, a surface on which only the bonding agent is provided and a surface on which both the adhesive and the bonding agent are provided. However, as described later, the adhesive is preferably provided on the adhesive surface.

An apparatus of the embodiments is an apparatus for setting a shape of a label having a front surface and a back surface provided on an opposite side to the front surface and capable of being wrapped around a cable extending in a first direction. The label has: a first part; and a second part adjacent to the first part in the first direction. The first part has a first protruding portion further protruding than the second part in a second direction perpendicular to the first direction and having a first adhesive surface on the back surface, and the second part has a second protruding portion further protruding than the first part in a third direction opposite to the second direction and having a second adhesive surface on the back surface. The apparatus is configured to: acquire label width information for setting a width of the second part in the first direction; acquire display area length information for setting a height in the second direction of a display area of the second part; acquire overlap width length information for setting a height in the second direction of an overlap width area of the second part, an end portion of the display area in the third direction being capable of adhering to the overlap width area; acquire temporary fixed length information for setting a height of the first protruding portion in the second direction; and set a shape of the label, based on the acquired label width information, display area length information, overlap width length information and temporary fixed length information.

An apparatus of the embodiments is an apparatus for setting a shape of a label having a front surface and a back surface provided on an opposite side to the front surface and capable of being wrapped around a cable extending in a first direction. The label has: a first label portion comprising a first display area; a second label portion adjacent to the first label portion in the first direction and comprising a second display area; and a leg portion adjacent to the first label portion in a second direction perpendicular to the first direction and having a width smaller than a width of the first display area in the first direction so as to wrap around the cable. The apparatus is configured to: acquire label width information for setting a width of the first label portion in the first direction; acquire wrapping portion width information for setting a width of the leg portion in the first direction; acquire wrapping portion length information for setting a height in the second direction of a wrapping portion of the leg portion, the wrapping portion facing a surface of the cable when wrapped around the cable; acquire neck length information for setting an interval in the second direction between the wrapping portion of the leg portion and the first label portion; and set a shape of the label, based on the acquired label width information, wrapping portion width information, wrapping portion length information and neck length information.

An apparatus of the embodiments is an apparatus for setting a shape of a label having a front surface and a back surface provided on an opposite side to the front surface and capable of being wrapped around a cable extending in a first direction. The label has: a label portion comprising a display area and configured to be wrapped around the cable; and a laminate portion adjacent to the label portion in a second direction perpendicular to the first direction and configured to be wrapped on the label portion. The apparatus is configured to: acquire label width information for setting a width of the label portion in the first direction; acquire display area length information for setting a height of the label portion in the second direction; acquire laminate length information for setting a height of the laminate portion in the second direction; and set a shape of the label, based on the acquired label width information, display area length information and laminate length information.

The apparatuses may further include an input unit for inputting information such as label width information. The input unit may be a keyboard for inputting the information by characters, a mouse for inputting the information based on a position of a pointer on a display, or a microphone for inputting the information by voice.

A printing apparatus of the embodiments includes: a conveying unit configured to convey a print medium having a release paper and a label sheet bonded to the release paper; a printing unit configured to perform printing on the label sheet; and a cutting unit configured to acquire information indicative of the shape of the label set by the apparatus as described above and cutting the label sheet based on the acquired information.

In the present disclosure, the method of "acquiring information indicative of a label shape" includes a method of connecting the "apparatus" to the "printing apparatus" in a wired or wireless manner to establish a communicable state and acquiring the information indicative of the label shape from the "apparatus", and a method of connecting a storage medium (for example, an SD card, an HDD, an SSD and the like), in which the information indicative of the label shape set by the "apparatus" is stored, to the printing apparatus directly or via a communication network and acquiring the information from the storage medium.

The printing unit may be configured to cut the label sheet so that a direction of conveying the print medium and the second direction are substantially parallel to each other.

A printing system of the embodiments includes: a conveying unit configured to convey a print medium having a release paper and a label sheet bonded to the release paper; a printing unit configured to perform printing on the label sheet; the apparatus as described above; and a cutting unit configured to acquire information indicative of the shape of the label set by the apparatus and cutting the label sheet based on the acquired information.

The invention claimed is:

1. A non-transitory computer-readable medium storing a computer program for setting a shape of a label having a front surface and a back surface provided on an opposite side to the front surface and capable of being wrapped around a cable extending in a first direction, the label having:
   a first part; and
   a second part adjacent to the first part in the first direction,
   wherein the first part has a first protruding portion further protruding than the second part in a second direction perpendicular to the first direction and having a first adhesive surface on the back surface, and
   wherein the second part has a second protruding portion further protruding than the first part in a third direction opposite to the second direction and having a second adhesive surface on the back surface,
   the computer program being for causing a computer to execute:
   receiving an input of label width information for setting a width of the second part in the first direction;
   receiving an input of display area length information for setting a height in the second direction of a display area of the second part;
   receiving an input of overlap width length information for setting a height in the second direction of an overlap width area of the second part, an end portion of the display area in the third direction being capable of adhering to the overlap width area;
   receiving an input of temporary fixed length information for setting a height of the first protruding portion in the second direction; and
   setting a shape of the label, based on the input label width information, display area length information, overlap width length information and temporary fixed length information.

2. A non-transitory computer-readable medium storing a computer program for setting a shape of a label having a front surface and a back surface provided on an opposite side to the front surface and capable of being wrapped around a cable extending in a first direction, the label having:
   a first label portion comprising a first display area;
   a second label portion adjacent to the first label portion in the first direction and comprising a second display area; and
   a leg portion adjacent to the first label portion in a second direction perpendicular to the first direction and having a width smaller than a width of the first display area in the first direction so as to wrap around the cable,
   the computer program being for causing a computer to execute:
   receiving an input of label width information for setting a width of the first label portion in the first direction;
   receiving an input of wrapping portion width information for setting a width of the leg portion in the first direction;
   receiving an input of wrapping portion length information for setting a height in the second direction of a wrapping portion of the leg portion, the wrapping portion facing a surface of the cable when wrapped around the cable;
   receiving an input of neck length information for setting an interval in the second direction between the wrapping portion of the leg portion and the first label portion; and
   setting a shape of the label, based on the input label width information, wrapping portion width information, wrapping portion length information and neck length information.

3. A non-transitory computer-readable medium storing a computer program for setting a shape of a label having a front surface and a back surface provided on an opposite side to the front surface and capable of being wrapped around a cable extending in a first direction, the label having:
   a label portion comprising a display area and configured to be wrapped around the cable; and
   a laminate portion adjacent to the label portion in a second direction perpendicular to the first direction and configured to be wrapped on the label portion,
   the computer program being for causing a computer to execute:
   receiving an input of label width information for setting a width of the label portion in the first direction;
   receiving an input of display area length information for setting a height of the label portion in the second direction;
   receiving an input of laminate length information for setting a height of the laminate portion in the second direction; and
   setting a shape of the label, based on the input label width information, display area length information and laminate length information.

4. The non-transitory computer-readable medium according to claim 1, wherein the computer program is a computer program for setting a shape of a label formed by cutting a label sheet bonded to a release paper, and wherein the computer program is for causing the computer to further execute arranging and displaying a label having the set shape in the label sheet so that a longitudinal direction of the label sheet and the second direction are substantially parallel to each other.

5. An apparatus for setting a shape of a label having a front surface and a back surface provided on an opposite side to the front surface and capable of being wrapped around a cable extending in a first direction, the label having:
   a first part; and
   a second part adjacent to the first part in the first direction,
   wherein the first part has a first protruding portion further protruding than the second part in a second direction perpendicular to the first direction and having a first adhesive surface on the back surface, and
   wherein the second part has a second protruding portion further protruding than the first part in a third direction opposite to the second direction and having a second adhesive surface on the back surface,
   the apparatus being configured to:
   acquire label width information for setting a width of the second part in the first direction;
   acquire display area length information for setting a height in the second direction of a display area of the second part;
   acquire overlap width length information for setting a height in the second direction of an overlap width area of the second part, an end portion of the display area in the third direction being capable of adhering to the overlap width area;
   acquire temporary fixed length information for setting a height of the first protruding portion in the second direction; and
   set a shape of the label, based on the acquired label width information, display area length information, overlap width length information and temporary fixed length information.

6. An apparatus for setting a shape of a label having a front surface and a back surface provided on an opposite side to the front surface and capable of being wrapped around a cable extending in a first direction, the label having:
   a first label portion comprising a first display area;
   a second label portion adjacent to the first label portion in the first direction and comprising a second display area; and
   a leg portion adjacent to the first label portion in a second direction perpendicular to the first direction and having a width smaller than a width of the first display area in the first direction so as to wrap around the cable,
   the apparatus being configured to:
   acquire label width information for setting a width of the first label portion in the first direction;
   acquire wrapping portion width information for setting a width of the leg portion in the first direction;
   acquire wrapping portion length information for setting a height in the second direction of a wrapping portion of the leg portion, the wrapping portion facing a surface of the cable when wrapped around the cable;
   acquire neck length information for setting an interval in the second direction between the wrapping portion of the leg portion and the first label portion; and
   set a shape of the label, based on the acquired label width information, wrapping portion width information, wrapping portion length information and neck length information.

7. An apparatus for setting a shape of a label having a front surface and a back surface provided on an opposite side to the front surface and capable of being wrapped around a cable extending in a first direction, the label having:
   a label portion comprising a display area and configured to be wrapped around the cable; and
   a laminate portion adjacent to the label portion in a second direction perpendicular to the first direction and configured to be wrapped on the label portion,
   the apparatus being configured to:
   acquire label width information for setting a width of the label portion in the first direction;
   acquire display area length information for setting a height of the label portion in the second direction;
   acquire laminate length information for setting a height of the laminate portion in the second direction; and
   set a shape of the label, based on the acquired label width information, display area length information and laminate length information.

8. A printing apparatus comprising:
   a conveying unit configured to convey a print medium having a release paper and a label sheet bonded to the release paper;
   a printing unit configured to perform printing on the label sheet; and
   a cutting unit configured to acquire information indicative of the shape of the label set by the apparatus according to claim 5 and cutting the label sheet based on the acquired information.

9. The printing apparatus according to claim 8, wherein the printing unit is configured to cut the label sheet so that a direction of conveying the print medium and the second direction are substantially parallel to each other.

10. A printing system comprising:
   a conveying unit configured to convey a print medium having a release paper and a label sheet bonded to the release paper;
   a printing unit configured to perform printing on the label sheet;
   the apparatus according to claim 5; and
   a cutting unit configured to acquire information indicative of the shape of the label set by the apparatus and cutting the label sheet based on the acquired information.

11. The non-transitory computer-readable medium according to claim 2, wherein the computer program is a computer program for setting a shape of a label formed by cutting a label sheet bonded to a release paper, and
   wherein the computer program is for causing the computer to further execute arranging and displaying a label having the set shape in the label sheet so that a longitudinal direction of the label sheet and the second direction are substantially parallel to each other.

12. The non-transitory computer-readable medium according to claim 3, wherein the computer program is a computer program for setting a shape of a label formed by cutting a label sheet bonded to a release paper, and
   wherein the computer program is for causing the computer to further execute arranging and displaying a label having the set shape in the label sheet so that a longitudinal direction of the label sheet and the second direction are substantially parallel to each other.

13. A printing apparatus comprising:
   a conveying unit configured to convey a print medium having a release paper and a label sheet bonded to the release paper;
   a printing unit configured to perform printing on the label sheet; and a cutting unit configured to acquire information indicative of the shape of the label set by the apparatus according to claim 6 and cutting the label sheet based on the acquired information.

14. A printing apparatus comprising:
a conveying unit configured to convey a print medium having a release paper and a label sheet bonded to the release paper;
a printing unit configured to perform printing on the label sheet; and
a cutting unit configured to acquire information indicative of the shape of the label set by the apparatus according to claim 7 and cutting the label sheet based on the acquired information.

15. A printing system comprising:
a conveying unit configured to convey a print medium having a release paper and a label sheet bonded to the release paper;
a printing unit configured to perform printing on the label sheet;
the apparatus according to claim 6; and
a cutting unit configured to acquire information indicative of the shape of the label set by the apparatus and cutting the label sheet based on the acquired information.

16. A printing system comprising:
a conveying unit configured to convey a print medium having a release paper and a label sheet bonded to the release paper;
a printing unit configured to perform printing on the label sheet;
the apparatus according to claim 7; and
a cutting unit configured to acquire information indicative of the shape of the label set by the apparatus and cutting the label sheet based on the acquired information.

* * * * *